US011333613B2

(12) United States Patent
Tillotson et al.

(10) Patent No.: US 11,333,613 B2
(45) Date of Patent: May 17, 2022

(54) APPARATUS AND METHODS OF INSPECTING A WIRE SEGMENT

(71) Applicant: The Boeing Company, Huntington Beach, CA (US)

(72) Inventors: Brian J. Tillotson, Kent, WA (US); Robert Paul Higgins, Seattle, WA (US); Andrej Martin Savol, Lake Tapps, WA (US)

(73) Assignee: The Boeing Company, Chicago, IL (US)

(*) Notice: Subject to any disclaimer, the term of this patent is extended or adjusted under 35 U.S.C. 154(b) by 1086 days.

(21) Appl. No.: 14/680,293

(22) Filed: Apr. 7, 2015

(65) Prior Publication Data
US 2016/0299086 A1 Oct. 13, 2016

(51) Int. Cl.
*G01N 21/88* (2006.01)
*G01N 21/952* (2006.01)
*G06T 7/00* (2017.01)

(52) U.S. Cl.
CPC ..... *G01N 21/8806* (2013.01); *G01N 21/8803* (2013.01); *G01N 21/952* (2013.01); *G06T 7/0004* (2013.01); *G01N 2201/068* (2013.01)

(58) Field of Classification Search
CPC .......... G01N 21/8806; G01N 21/8803; G01N 2201/068; G04N 21/952; G06T 7/0004
See application file for complete search history.

(56) References Cited

U.S. PATENT DOCUMENTS

| 4,358,202 A | * | 11/1982 | Puffer | G01N 21/952 |
| | | | | 250/235 |
| 4,859,948 A | * | 8/1989 | Kuster | G01R 33/28 |
| | | | | 324/318 |
| 5,050,093 A | | 9/1991 | Reddy et al. | |
| 5,936,725 A | * | 8/1999 | Pike | G01B 11/08 |
| | | | | 348/125 |
| 6,088,609 A | * | 7/2000 | Larison, II | A61B 5/0448 |
| | | | | 439/909 |
| 6,217,006 B1 | * | 4/2001 | Muller | H02G 1/08 |
| | | | | 138/96 T |
| 6,279,215 B1 | * | 8/2001 | Nomoto | H01R 43/052 |
| | | | | 29/33 M |

(Continued)

FOREIGN PATENT DOCUMENTS

| EP | 2541236 A1 | 1/2013 |
| JP | S5895911 A | 6/1983 |

(Continued)

OTHER PUBLICATIONS

EPO Extended Search Report for related application 16163687.3 dated Oct. 12, 2016; 6 pp.

*Primary Examiner* — Joseph Suh
(74) *Attorney, Agent, or Firm* — Armstrong Teasdale LLP (57) ABSTRACT

An apparatus for use in inspecting a wire segment is provided. The apparatus includes a guide tube sized to receive the wire segment, and an array of mirrors positioned about the guide tube. Each mirror in the array is oriented such that a reflection of the wire segment in the array of mirrors forms a circumferential view of at least a portion of the wire segment, and such that the reflection from each mirror is within a field of view from a single vantage point.

20 Claims, 12 Drawing Sheets

(56) References Cited

U.S. PATENT DOCUMENTS

| | | | |
|---|---|---|---|
| 6,512,536 B1* | 1/2003 | Ross | G01B 11/105 348/61 |
| 6,516,083 B1 | 2/2003 | Bonechi et al. | |
| 6,842,258 B1 | 1/2005 | Leinvuo et al. | |
| 2006/0000198 A1* | 1/2006 | Priegelmeir | D07B 3/10 57/115 |
| 2006/0033919 A1* | 2/2006 | Moshe | A24C 5/3412 356/430 |
| 2008/0036969 A1* | 2/2008 | Otsuka | G02B 27/2271 353/7 |
| 2009/0126181 A1* | 5/2009 | Locher | H01R 43/05 29/564.4 |
| 2009/0208053 A1* | 8/2009 | Kent | G06T 7/269 382/103 |
| 2010/0202071 A1* | 8/2010 | Preumont | G02B 26/06 359/849 |
| 2011/0083577 A1* | 4/2011 | Tilley | B61B 7/06 104/96 |
| 2011/0110724 A1* | 5/2011 | Baylot | B63B 21/508 405/224 |
| 2011/0130057 A1* | 6/2011 | Denise | B63B 21/508 441/5 |
| 2012/0224666 A1* | 9/2012 | Speller | G01T 1/1603 378/8 |
| 2013/0293706 A1* | 11/2013 | Pison | G01N 13/00 348/135 |
| 2013/0296718 A1* | 11/2013 | Ranganathan | A61B 5/02 600/481 |
| 2015/0188031 A1* | 7/2015 | Kijima | H05B 3/0038 505/300 |
| 2015/0336767 A1* | 11/2015 | Ondo | B65H 57/12 226/97.1 |
| 2016/0148898 A1* | 5/2016 | Cheng | H01L 24/78 228/4.5 |
| 2016/0181069 A1* | 6/2016 | Watson | A61B 18/042 315/111.41 |
| 2016/0344269 A1* | 11/2016 | Yabe | H02K 3/50 |
| 2017/0075102 A1* | 3/2017 | Wada | G02B 23/2476 |

FOREIGN PATENT DOCUMENTS

| | | |
|---|---|---|
| JP | H09119818 A | 5/1997 |
| JP | H11-311610 A | 11/1999 |
| JP | 2000-241363 * | 9/2000 |
| JP | 2014055921 A | 3/2014 |
| WO | 2010092619 A1 | 8/2010 |

* cited by examiner

APPARATUS AND METHODS OF INSPECTING A WIRE SEGMENT

BACKGROUND

The field of the present disclosure relates generally to wire inspection techniques and, more specifically, to an apparatus and methods that facilitate efficient inspection of a wire segment.

Many modern technological assemblies include electrical wires that must undergo a series of processing steps prior to their installation within the assembly. More specifically, electrical wires are generally delivered in large spools, such that each portion of electrical wire is measured and cut, each end of the cut electrical wire is stripped and inserted into a specific end piece, and each end is crimped to facilitate sufficient electrical contact with a lug, pin, or socket, for example. Several errors may occur during one or more of these processing steps. For example, an insufficient amount of electrically conductive material may be exposed after the stripping step, or stray strands of electrically conductive material may be exposed if an end of the electrical wire is improperly inserted into a lug, pin, or socket. At least some of these electrical wires are visually inspected by a technician to ensure the electrical wire has been properly processed prior to its installation within the assembly. This inspection is a time-consuming and laborious task because the entire area about the processed portions of the electrical wire must be inspected carefully, and there is typically a large number of such wire segments to be inspected.

BRIEF DESCRIPTION

In one aspect, an apparatus for use in inspecting a wire segment is provided. The apparatus includes a guide tube sized to receive the wire segment, and an array of mirrors positioned about the guide tube. Each mirror in the array is oriented such that a reflection of the wire segment in the array of mirrors forms a circumferential view of at least a portion of the wire segment, and such that the reflection from each mirror is within a field of view from a single vantage point.

In another aspect, a system for use in inspecting a wire segment is provided. The system includes a guide tube sized to receive the wire segment, and an array of mirrors positioned about the guide tube. Each mirror in the array is oriented such that a reflection of the wire segment in the array of mirrors forms a circumferential view of at least a portion of the wire segment, and such that the reflection from each mirror is within a field of view from a single vantage point. The system also includes a visual imaging device positioned at the single vantage point. The visual imaging device is configured to capture at least one image of the reflection of the wire segment.

In yet another aspect, a method of inspecting a wire segment is provided. The method includes positioning the wire segment within a guide tube, orienting mirrors in an array of mirrors positioned about the guide tube such that a reflection of the wire segment from each mirror in the array of mirrors forms a circumferential view of at least a portion of the wire segment, and such that the reflection from each mirror is within a field of view from a single vantage point. The method further includes determining defects in the wire segment from the reflection of the at least a portion of the wire segment.

DETAILED DESCRIPTION

The implementations described herein relate to an apparatus, system, and methods of inspecting a wire segment in a more efficient manner. More specifically, the apparatus includes a guide tube sized to receive the wire segment and an array of mirrors positioned about the guide tube. The mirrors in the array are oriented such that a full circumferential view of the wire segment can be viewed from a single vantage point. Moreover, mirrors in the array can be arranged in different configurations such that each configuration enables the full circumferential view to be visible from the single vantage point. In some implementations, a visual imaging device is used to inspect the wire segment by capturing an image of a reflection of the wire segment from the array of mirrors. While each configuration of the array of mirrors enables the full circumferential view to be visible in a reflection therefrom, at least some of the configurations facilitate reducing the number of pixels needed to achieve an adequate spatial resolution in a full view of the wire segment in the image captured by the visual imaging device. More specifically, at least some of the configurations facilitate reducing the number of pixels in the pixel array that contain no useful information when the image is captured from the single vantage point. As such, reducing the number of pixels enables faster processing speeds of the images, reduces memory storage requirements, and thus reduces costs associated with visual imaging devices described herein.

Figure 1:
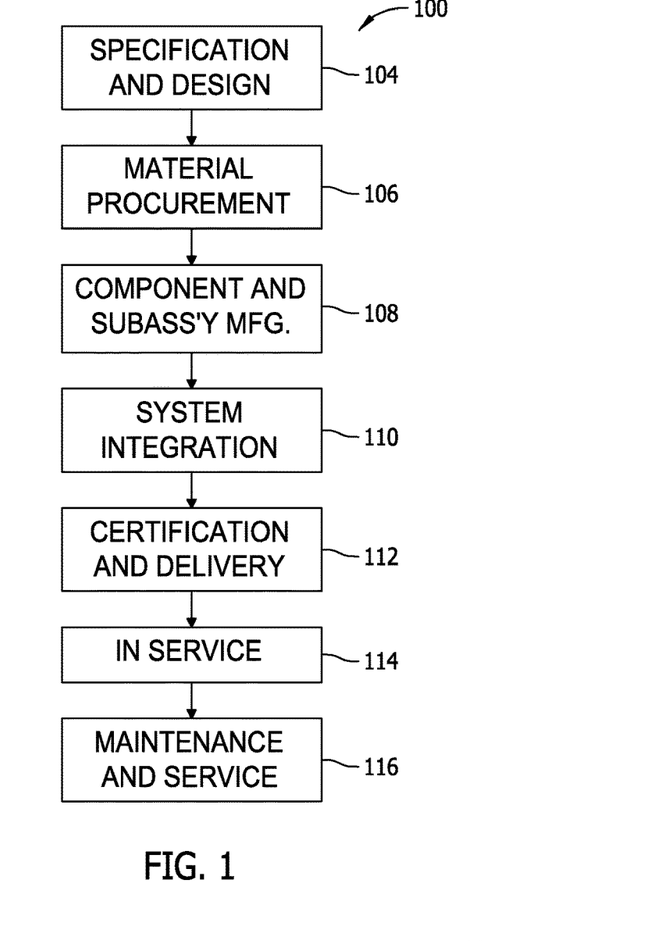
FIG. 1 is a flow diagram of an exemplary aircraft production and service method.
Figure 2:
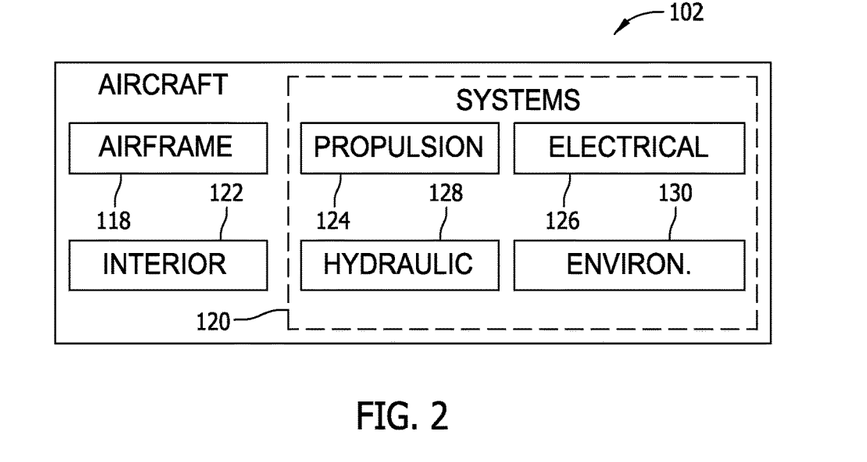
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
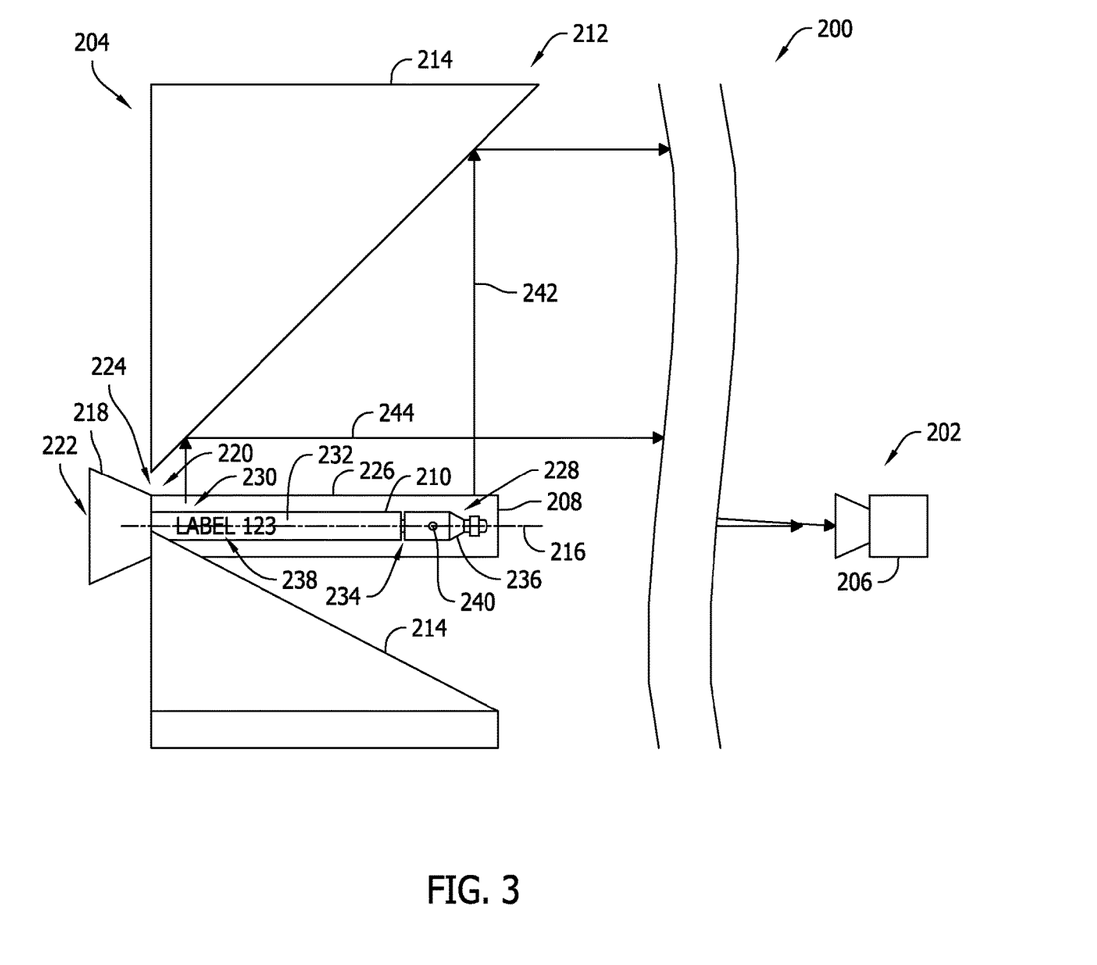
FIG. 3 is a schematic side view illustration of an exemplary wire inspection system.
Figure 4:
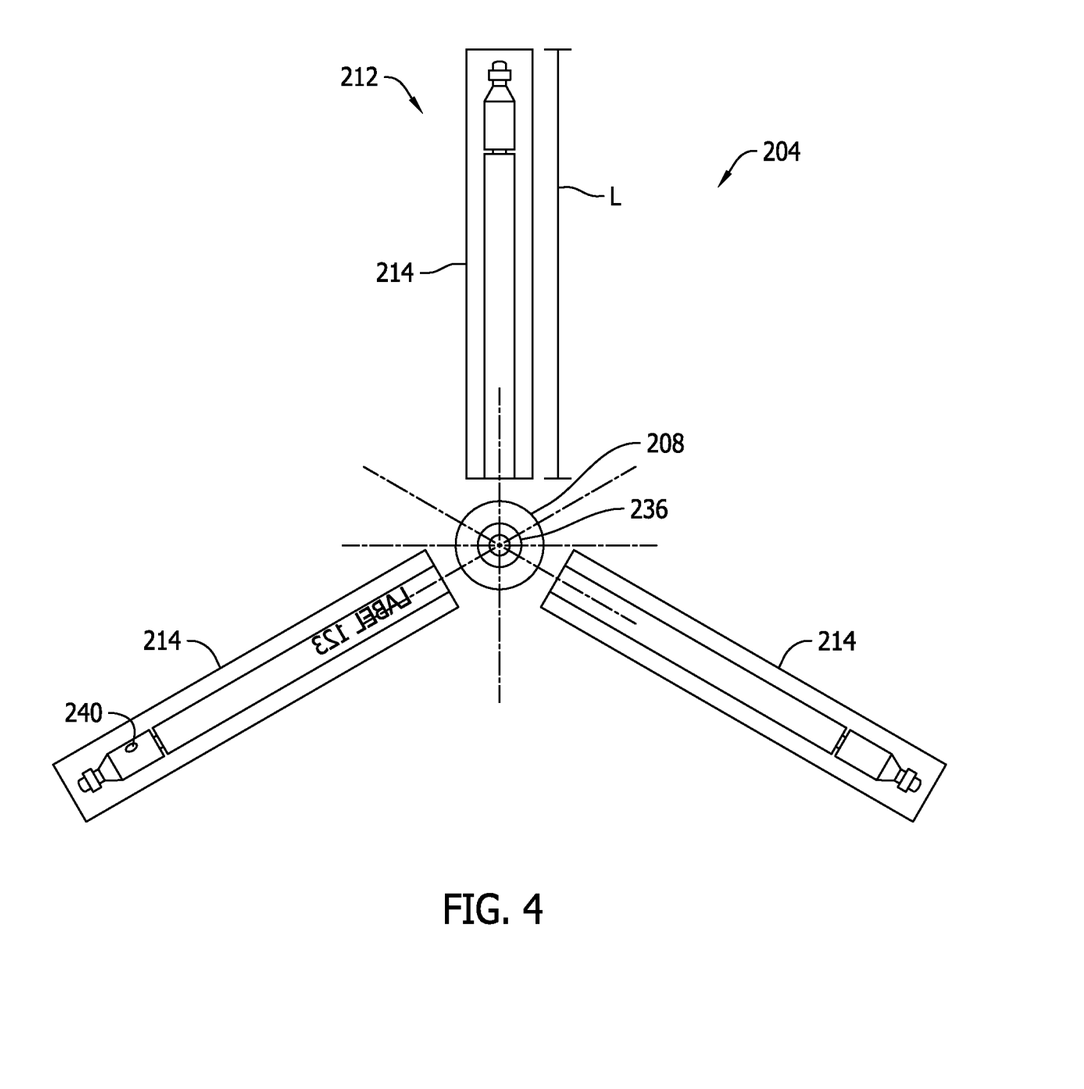
FIG. 4 is a view of the wire inspection system shown in FIG. 3 from an exemplary vantage point.

FIG. 3 is a schematic side view illustration of an exemplary wire inspection system 200, and FIG. 4 is a view of wire inspection system 200 from an exemplary vantage point 202. In the exemplary implementation, wire inspection system 200 a viewing apparatus 204 and a visual imaging device 206. Viewing apparatus 204 includes a guide tube 208 sized to receive a wire segment 210 therethrough, and an array 212 of mirrors 214 positioned about guide tube 208. Each mirror 214 in array 212 is oriented such that a reflection of wire segment 210 in array 212 forms a full circumferential view of at least a portion of wire segment 210. Moreover, each mirror 214 in array 212 is oriented such that the reflection from each mirror 214 is within the field of view from a single vantage point 202. More specifically, in one implementation, and as will be described in more detail below, visual imaging device 206 is positioned at vantage point 202. Visual imaging device 206 captures at least one image of wire segment 210 in the reflection.

In the exemplary implementation, array 212 includes at least three mirrors 214 spaced at regular intervals about guide tube 208. For example, when array 212 includes three mirrors 214, each mirror 214 is positioned at 120° intervals about guide tube 208 to enable the full circumferential view of wire segment 210 to be formed in the sum of the reflections from each mirror 214. At least three mirrors 214 are used in array 212 to ensure proper viewing angles of the cylindrically-shaped wire segment 210 are obtained in the reflections from each mirror 214. However, alternatively, array 212 can include any number of mirrors 214 that enables wire inspection system 200 to function as described herein. Moreover, alternatively, mirrors 214 can be spaced from each other at irregular intervals about guide tube 208.

As described above, guide tube 208 is sized to receive wire segment 210 therein. More specifically, guide tube 208 constrains wire segment 210 such that it extends substantially coaxially with a centerline 216 of guide tube 208. As such, wire segment 210 remains within the field of view from vantage point 202 and facilitates ensuring the full circumferential view of wire segment 210 is formed. In the exemplary implementation, vantage point 202 is substantially coaxially aligned with centerline 216.

In one implementation, an insertion guide 218 is coupled to an insertion portion 220 of guide tube 208. Insertion guide 218 includes a first opening 222 and a second opening 224 adjacent to insertion portion 220 and having a smaller cross-sectional area than first opening 222. As such, insertion guide 218 facilitates positioning wire segment 210 within guide tube 208 as wire segment 210 is inserted therethrough.

Guide tube 208 may be fabricated from any material that enables wire inspection system 200 to function as described herein. In the exemplary implementation, guide tube 208 is fabricated from an at least partially transparent material. As such, wire segment 210 is visible through side walls 226 of guide tube 208, and is thus visible in the reflection from mirrors 214 at vantage point 202.

In some implementations, wire segment 210 includes a first inspection zone 228 and a second inspection zone 230 defined at different lengths along wire segment 210. Inspection zones 228 and 230 extend circumferentially about wire segment 210. Moreover, wire segment 210 includes a covered portion 232, an exposed portion 234, and a socket 236 at least partially covering exposed portion 234. Covered portion 232 includes a label 238 that facilitates identifying wire segment 210, and that may be analyzed to determine acceptable processing characteristics for wire segment 210, for example. Moreover, socket 236 includes a viewing hole 240 that facilitates inspection of an interface between exposed portion 234 and socket 236. As such, in one implementation, first inspection zone 228 generally corresponds to the region of wire segment 210 near the interface between exposed portion 234 and socket 236, and second inspection zone 230 generally corresponds to the region of wire segment 210 near label 238.

Referring to FIG. 4, array 212 of mirrors 214 in wire inspection system 200 is oriented such that the reflection from array 212 includes an image of first inspection zone 228 and second inspection zone 230 therein. More specifically, each mirror 214 in array 212 has a length L such that the reflection from a single mirror in array 212 includes the image of first and second inspection zones 228 and 230 when viewed from vantage point 202. As such, images of both first and second inspection zones 228 and 230 are visible in the same reflection, and thus can be analyzed simultaneously.

In operation, wire segment 210 is positioned within guide tube 208, and visual imaging device 206 captures at least one image of the reflection of wire segment 210. A distance of a first optical path 242 defined between first inspection zone 228 and visual imaging device 206 is substantially similar to a distance of a second optical path 244 defined between defined between second inspection zone 230 and visual imaging device 206. As such, visual imaging device 206 can have a relatively low depth of field and still capture images having first and second inspection zones 228 and 230 in focus in the reflection from array 212. In an alternative implementation, visual imaging device 206 is omitted, and a technician manually inspects wire segment 210 from vantage point 202.

In some implementations, either wire segment 210 or array 212 is rotatable about centerline 216. As such, first and second inspection zones 228 and 230 and, more specifically, "Label 123" and viewing hole 240 are oriented to provide an enhanced view thereof from vantage point 202.

Figure 5:
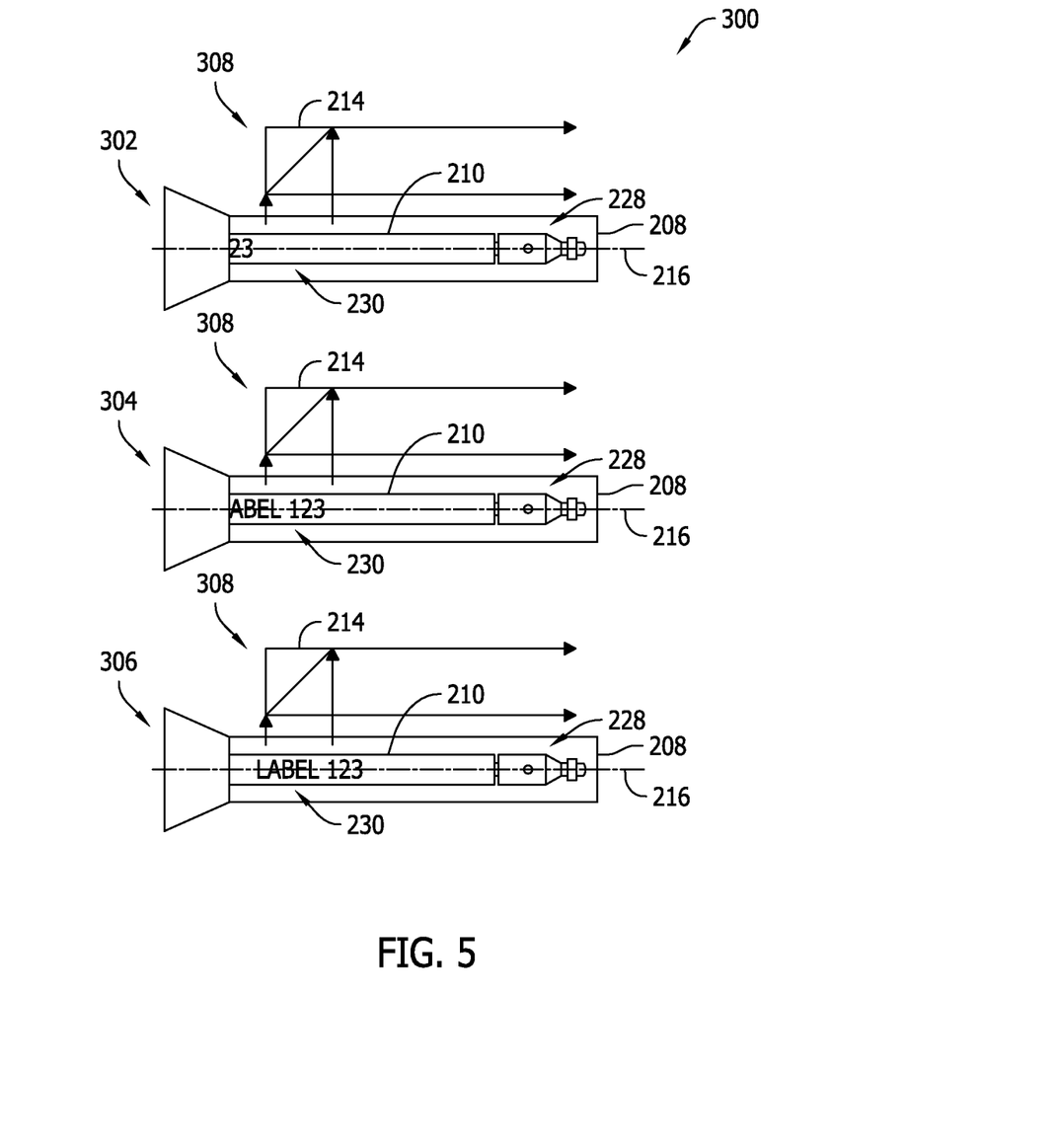
FIG. 5 is a schematic side view illustration of an alternative wire inspection system.

FIG. 5 is a schematic side view illustration of an alternative wire inspection system 300. In the exemplary implementation, wire inspection system 300 is shown with wire segment 210 in a first insertion position 302, in a second insertion position 304, and in a third insertion position 306. Wire inspection system 300 includes an array 308 of mirrors 214 positioned adjacent to insertion portion 220 of guide tube 208, such that array 308 is substantially aligned with insertion portion 220 relative to centerline 216. Mirrors 214 are sized such that an entire length of wire segment 210 to be inspected cannot be seen in a single mirror 214 from vantage point 202 (shown in FIG. 3).

However, in operation, wire segment 210 is selectively positioned within guide tube 208 such that the entire length of wire segment is within a field of view of array 308 during the insertion or removal of wire segment 210 within guide tube 208. For example, in one implementation, wire segment 210 is inserted or removed from guide tube 208 at a substantially constant rate. As such, visual imaging device 206 (shown in FIG. 3) captures at least one image as first inspection zone 228 is substantially aligned with array 308 of mirrors 214, and captures at least one image as second inspection zone 230 is substantially aligned with array 308 of mirrors 214.

In one implementation, visual imaging device 206 captures a plurality of images at short intervals as wire segment 210 is inserted or removed from guide tube 208. The short intervals are selected such that the images are captured when first and second inspection zones 228 and 230 are substantially aligned with array 308. Moreover, the short intervals may be either intervals of time or spatial intervals signaled by a positioning device (not shown) that detects a relative position of wire segment 210 within guide tube 208. For example, as shown in FIG. 5, visual imaging device 206 does not capture images of wire segment 210 when in first insertion position 302, and captures images of second inspection zone 230 of wire segment 210 when in second insertion position 304 and third insertion position 306.

Figure 6:
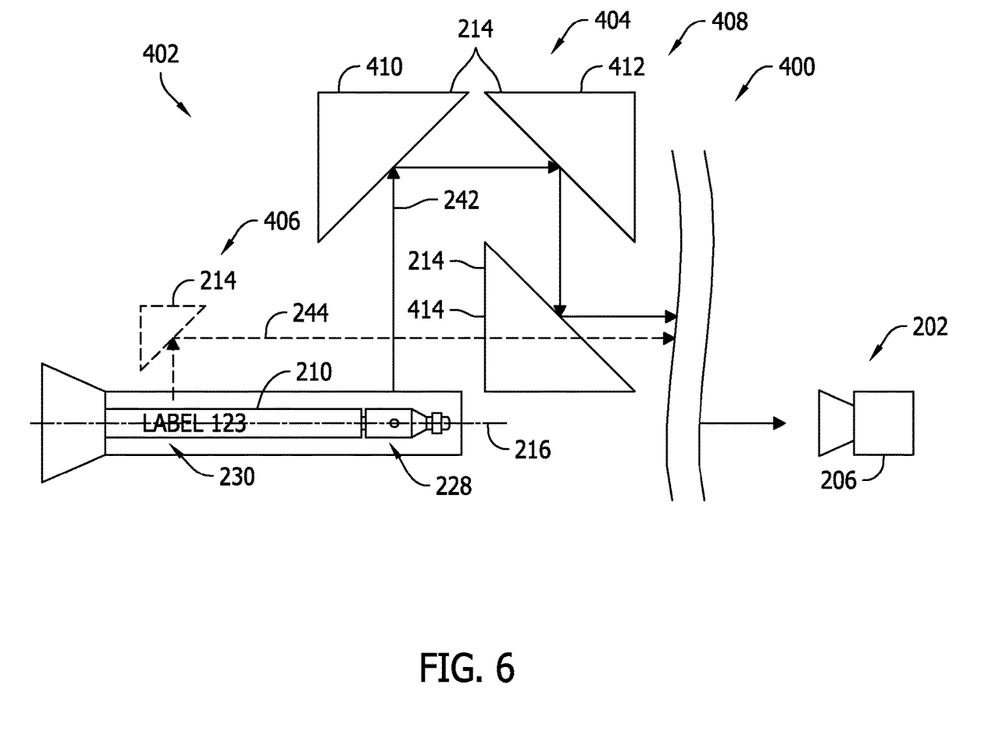
FIG. 6 is a schematic side view illustration of another alternative wire inspection system.
Figure 7:
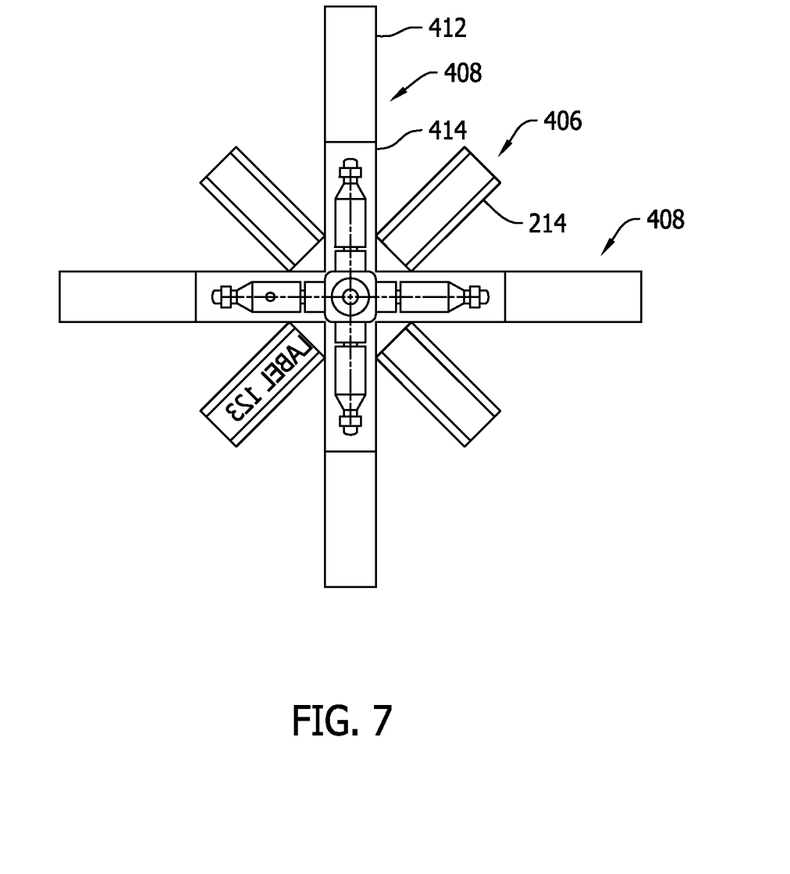
FIG. 7 is a view of the wire inspection system shown in FIG. 6 from an exemplary vantage point.

FIG. 6 is a schematic side view illustration of another alternative wire inspection system 400, and FIG. 7 is a view of wire inspection system 400 from an exemplary vantage point 202. In the exemplary implementation, wire inspection system 400 includes an array 402 of mirrors 214 that includes a first plurality 404 of mirrors 214, and a second plurality 406 of mirrors 214. First plurality 404 of mirrors 214 is oriented such that an image of first inspection zone 228 is in a first reflection from first plurality 404 of mirrors 214 when viewed from vantage point 202. Second plurality 406 of mirrors 214 is oriented such that an image of second inspection zone 230 is in a second reflection from second plurality 406 of mirrors 214 when viewed from vantage point 202. Mirrors 214 in first plurality 404 are offset from mirrors 214 in second plurality 406 relative to vantage point 202 and centerline 216. As such, mirrors 214 in first plurality 404 do not obstruct the line of sight between mirrors 214 in second plurality 406 and vantage point 202.

Moreover, first plurality 404 of mirrors 214 is positioned at a shorter distance from vantage point 202 than second plurality 406 of mirrors 214. First plurality 404 of mirrors 214 includes a plurality of groups 408 of mirrors 214 spaced at regular intervals about guide tube 208. Each group 408 of mirrors 214 includes a first mirror 410 substantially aligned with first inspection zone 228, a second mirror 412 aligned substantially coaxially with first mirror 410 relative to centerline 216, and a third mirror 414 substantially radially aligned with second mirror 412 relative to centerline 216. Mirrors 214 in each group 408 are spaced from each other and oriented such that a length of first optical path 242 from first inspection zone 228 to vantage point 202 is substantially similar to a length of second optical path 244 from second inspection zone 230 to single vantage point 202. As such, visual imaging device 206 can have a relatively low depth of field and still capture images having first and second inspection zones 228 and 230 in focus in the reflection from array 402.

Figure 8:
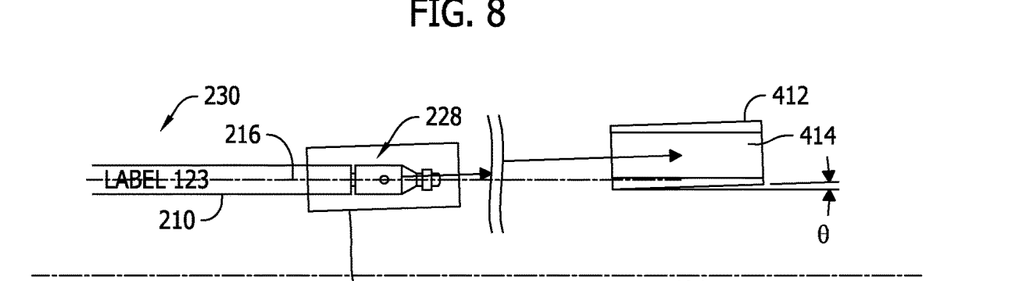
FIG. 8 is a schematic top view illustration of another alternative wire inspection system.
Figure 9:
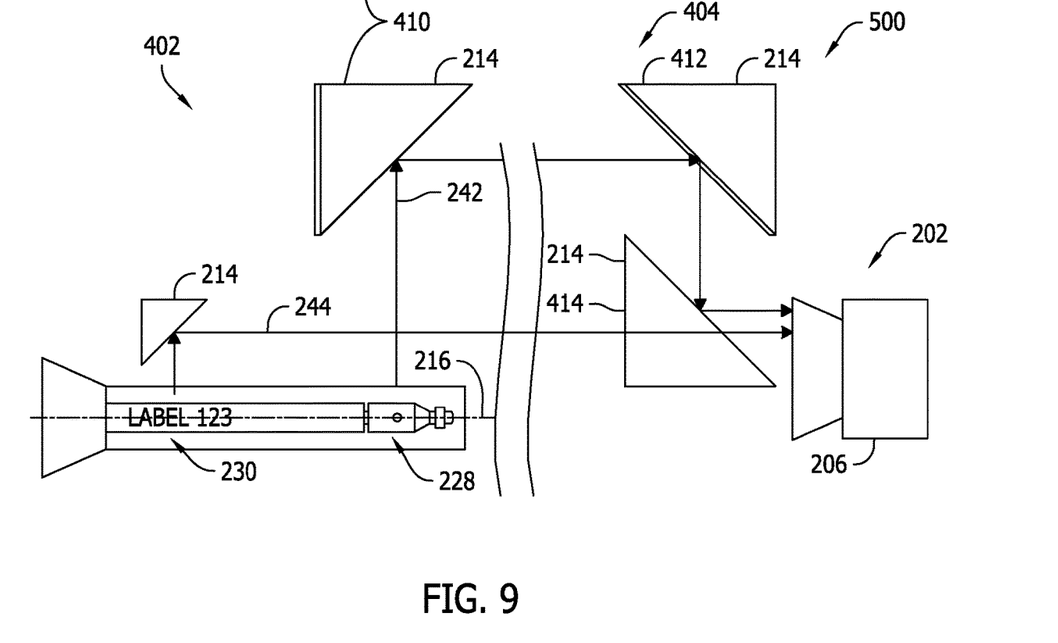
FIG. 9 is a schematic side view illustration of the wire inspection system shown in FIG. 8.
Figure 10:
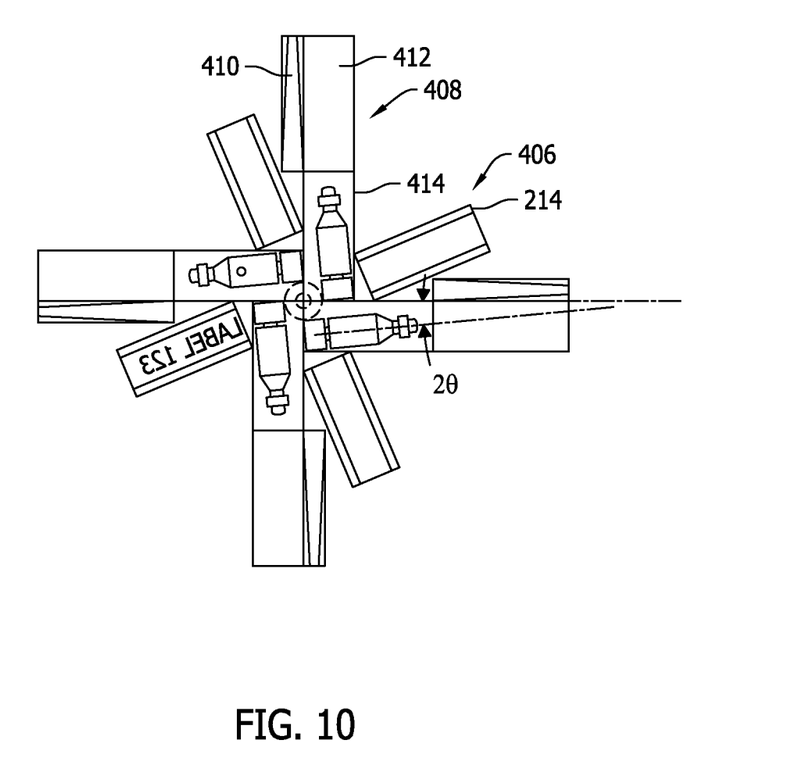
FIG. 10 is a view of the wire inspection system shown in FIG. 9 from an exemplary vantage point.

FIG. 8 is a schematic top view illustration of another alternative wire inspection system 500, FIG. 9 is a schematic side view illustration of wire inspection system 500, and FIG. 10 is a view of wire inspection system 500 from an exemplary vantage point 202. In the exemplary implementation, wire inspection system 500 includes array 402 of mirrors 214. First plurality 404 of mirrors 214 in array 402 is oriented such that first optical path 242 from first inspection zone 228 to vantage point 202 has an at least partially helical trajectory relative to centerline 216 of guide tube 208. More specifically, first mirror 410 and second mirror 412 are offset from centerline 216 by an angle $\Theta$, and third mirror 414 is aligned substantially parallel with centerline 216.

Referring to FIG. 10, offsetting first and second mirrors 410 and 412 relative to centerline 216 enables the image of first inspection zone 228 of wire segment 210 to appear offset relative to edges of third mirror 214 by an angle $2\Theta$. As such, a constraint on a distance that first and second mirrors 410 and 412 is set based on a predefined width of third mirror 414. For example, the closer first and second mirrors 410 and 412 are to each other, the greater angle $\Theta$ must be to enable first optical path 242 to be reflected from third mirror 414 to wire segment 210. However, angle $2\Theta$ of the image of wire segment 210 in third mirror 414 from vantage point 202 increases as angle $\Theta$ increases. As such, the distance between first and second mirrors 410 and 412, and the width of third mirror 414 are selected to ensure the image of wire segment 210 remains in the reflection from third mirror 414 when viewed from vantage point 202.

Figure 11:
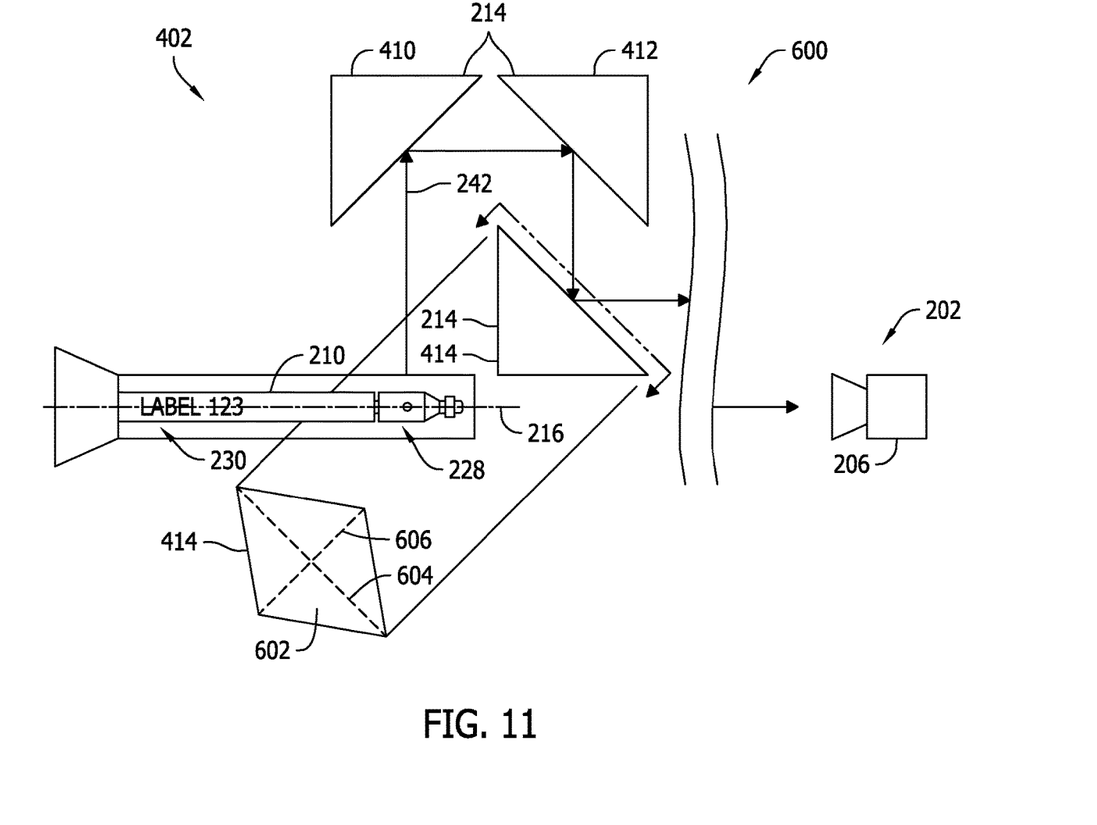
FIG. 11 is a schematic side view illustration of another alternative wire inspection system.
Figure 12:
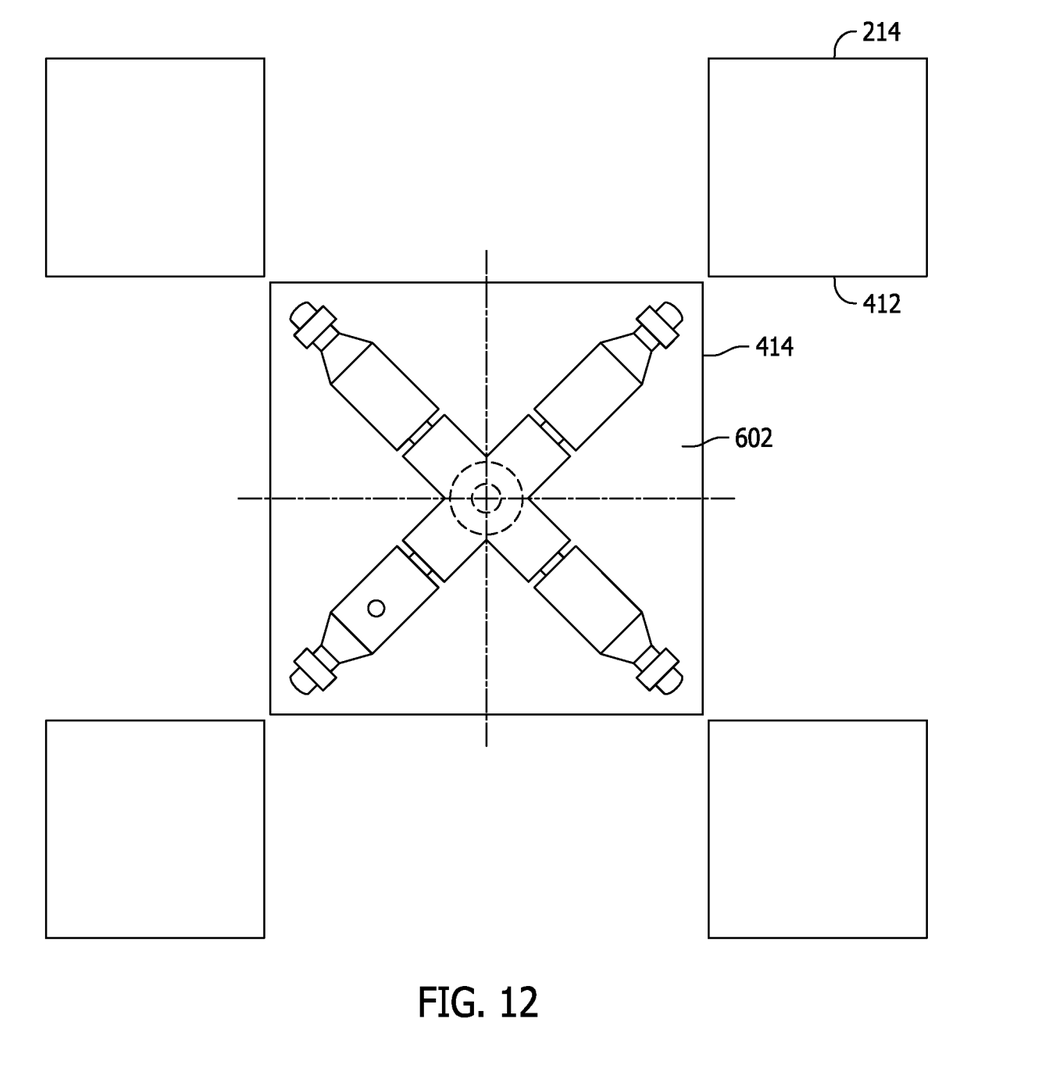
FIG. 12 is a view of the wire inspection system shown in FIG. 11 from an exemplary vantage point.

FIG. 11 is a schematic side view illustration of another alternative wire inspection system 600, and FIG. 12 is a view of wire inspection system 600 from an exemplary vantage point 202. In the exemplary implementation, wire inspection system 600 includes array 402 of mirrors 214. Third mirror 414 in array 402 includes a reflective face 602 having a substantially rhomboid-shaped profile. More specifically, a major axis 604 of reflective face 602 has a length equal to the square root of two times a length of a minor axis 606 of reflective face 602 (i.e., $L_{major} = \sqrt{2}L_{minor}$). As such, referring to FIG. 12, reflective face 602 appears to have a substantially square-shaped profile when major axis 604 extends substantially radially from centerline 216, and when viewed from vantage point 202.

Figure 13:
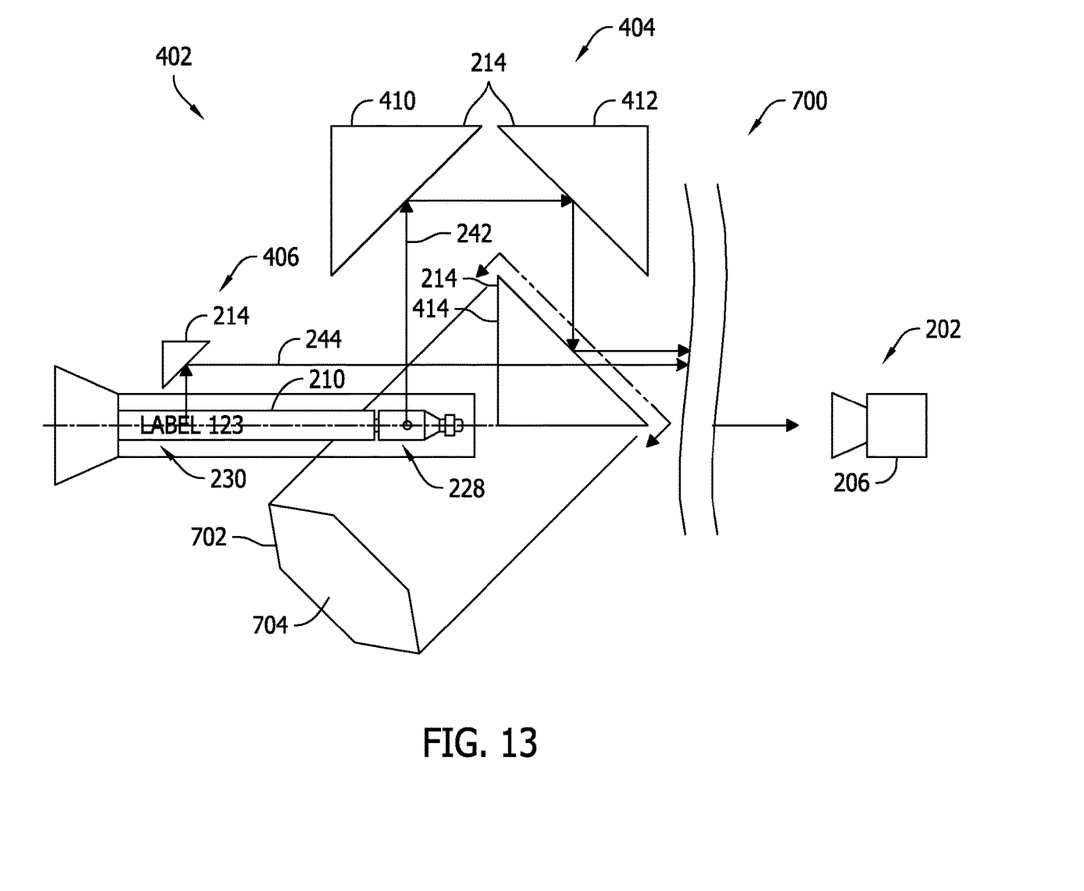
FIG. 13 is a schematic side view illustration of another alternative wire inspection system.
Figure 14:
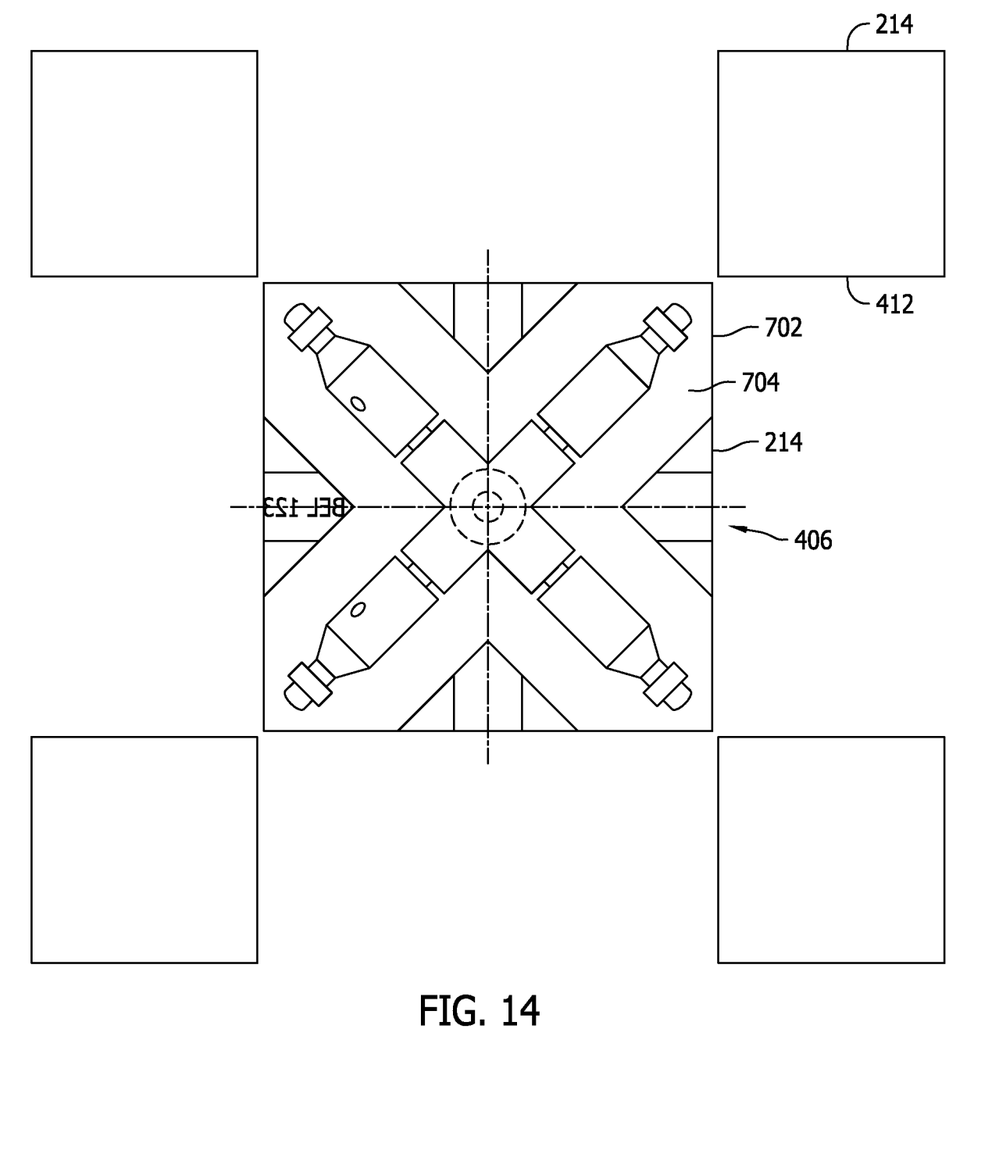
FIG. 14 is a view of the wire inspection system shown in FIG. 13 from an exemplary vantage point.

FIG. 13 is a schematic side view illustration of another alternative wire inspection system 700, and FIG. 14 is a view of wire inspection system 700 from an exemplary vantage point 202. In the exemplary implementation, wire inspection system 700 includes array 402 of mirrors 214. A third mirror 702 in array 402 includes reflective face 704 having a truncated rhomboid-shaped profile such that the second reflection from second plurality 406 of mirrors 214 is visible between adjacent third mirrors 702 in first plurality 404 when viewed from vantage point 202. More specifically, when compared to third mirrors 414, third mirrors 702 have a narrower profile such that portions of reflective face 602 of third mirrors 414 that do not show useful information about first inspection zone 228 are removed. Moreover, removing the portions of third mirrors 414 to form third mirrors 702 enables the reflection from second plurality 406 of mirrors 214 to be substantially unobstructed when viewed from vantage point 202.

As described above, the number of pixels in a pixel array (not shown) in an image captured by visual imaging device 206 that provide a full view of wire segment 210 in a reflection from the arrays described herein varies between wire inspection systems 200-700. Generally, the number of pixels required to provide a full view of wire segment 210 reduces in size as the implementations described herein progress from wire inspection system 200 to wire inspection system 700. Moreover, visual imaging device 206 may be in any orientation relative to viewing apparatus 204 that enables the pixel array to be reduced in size.

A method of inspecting a wire segment is also provided herein. The method includes positioning wire segment 210 within guide tube 208, orienting mirrors 214 in an array, such as array 212, of mirrors 214 positioned about guide tube 208 such that a reflection of wire segment 210 from each mirror 214 in the array or mirrors 214 forms a full circumferential view of at least a portion of wire segment 210, and such that the reflection from each mirror 214 is within a field of view from vantage point 202. The method also includes determining defects in wire segment 210 from the reflection of the at least a portion of wire segment 210.

The method further includes capturing at least one image of the reflection of wire segment 210, wherein the at least one image is captured from vantage point 202. The method further includes positioning the array of mirrors 214 adjacent to insertion portion 220 of guide tube 208, wherein a plurality of images of wire segment 210 in the reflection are captured at different time intervals as wire segment 210 is inserted through guide tube 208.

In one implementation, orienting mirrors 214 in the array includes orienting first plurality 404 of mirrors 214 such that the image of first inspection zone 228 is in a first reflection from first plurality 404 of mirrors 214 when viewed from vantage point 202, and orienting second plurality 406 of mirrors such that the image of second inspection zone 230 is in a second reflection from second plurality 406 of mirrors 214 when viewed from vantage point 202, wherein mirrors 214 in first plurality 404 are offset from mirrors 214 in second plurality 406 relative to vantage point 202. The method further includes positioning first plurality 404 of mirrors 214 at a shorter distance from vantage point 202 than second plurality 406 of mirrors 214, first plurality 404 of mirrors 214 including a plurality of groups 408 of mirrors 214 spaced at regular intervals about guide tube 208, and orienting mirrors 214 in each group 408 such that a length of first optical path 242 from first inspection zone 228 to vantage point 202 is substantially similar to a length of second optical path 244 from second inspection zone 230 to vantage point 202.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for use in inspecting a first inspection zone and a second inspection zone defined at different lengths along a single wire segment, said apparatus comprising:
    a guide tube comprising a side wall fabricated from an at least partially transparent material, said guide tube sized to receive the single wire segment; and
    an array of mirrors positioned about said side wall of said guide tube, wherein each mirror in said array is oriented such that:
        a reflection of the single wire segment in said array of mirrors forms a circumferential view of the first inspection zone and the second inspection zone of the single wire segment positioned within said side wall;
        the reflection from each mirror is within a field of view from a single vantage point; and
        a length of a first optical path from the first inspection zone to the single vantage point is substantially similar to a length of a second optical path from the second inspection zone to the single vantage point,
    wherein the single vantage point is coaxially aligned with a centerline of said guide tube;
    wherein said array of mirrors comprises:
        a first plurality of mirrors oriented such that the image of the first inspection zone is in a first reflection from said first plurality of mirrors when viewed from the single vantage point; and
        a second plurality of mirrors oriented such that the image of the second inspection zone is in a second reflection from said second plurality of mirrors when viewed from the single vantage point, wherein mirrors in said first plurality are offset from mirrors in said second plurality relative to the single vantage point;
        wherein said first plurality of mirrors is oriented such that a first optical path from the first inspection zone to the single vantage point has an at least partially helical trajectory relative to a centerline of said guide tube.

2. The apparatus in accordance with claim 1, wherein said array of mirrors comprises at least three mirrors spaced at regular intervals about said side wall of said guide tube.

3. The apparatus in accordance with claim 1, wherein each mirror in said array has a length such that the reflection from a single mirror includes the image of the first and second inspection zones when viewed from the single vantage point.

4. The apparatus in accordance with claim 1, wherein said first plurality of mirrors is positioned at a shorter distance from the single vantage point than said second plurality of mirrors, said first plurality of mirrors comprising a plurality of groups of mirrors spaced at regular intervals about said guide tube, wherein mirrors in each group are oriented such that a length of a first optical path from the first inspection zone to the single vantage point is substantially similar to a length of a second optical path from the second inspection zone to the single vantage point.

5. The apparatus in accordance with claim 4, wherein each mirror in said first plurality of mirrors includes a reflective face having a truncated rhomboid-shaped profile such that the second reflection from said second plurality of mirrors is visible between adjacent mirrors in said first plurality when viewed from the single vantage point.

6. The apparatus in accordance with claim 1, wherein each mirror in said first plurality of mirrors includes a reflective face having a truncated rhomboid-shaped profile such that the second reflection from said second plurality of mirrors is visible between adjacent mirrors in said first plurality when viewed from the single vantage point.

7. The apparatus in accordance with claim 1, wherein said first and second pluralities of mirrors each comprise four mirrors spaced at regular intervals about said guide tube.

8. A system for use in inspecting a first inspection zone and a second inspection zone defined at different lengths along a single wire segment, said system comprising:
   a guide tube comprising a side wall fabricated from an at least partially transparent material, said guide tube sized to receive the single wire segment;
   an array of mirrors positioned about said side wall of said guide tube, wherein each mirror in said array is oriented such that:
      a reflection in said array of mirrors forms a circumferential view of the first inspection zone and the second inspection zone of the single wire segment positioned within said side wall;
      the reflection from each mirror is within a field of view from a single vantage point; and
      a length of a first optical path from the first inspection zone to the single vantage point is substantially similar to a length of a second optical path from the second inspection zone to the single vantage point; and
   a visual imaging device positioned at the single vantage point, said visual imaging device coaxially aligned with a centerline of said guide tube and configured to capture at least one image of the reflection of the single wire segment, wherein the presence of defects in the single wire segment are determined from the reflection of the at least a portion of the single wire segment positioned within said side wall;
   wherein said array of mirrors is positioned adjacent to an insertion portion of said guide tube, said visual imaging device configured to capture a plurality of images of the single wire segment positioned within said side wall in the reflection at different time intervals as the single wire segment is inserted through said guide tube.

9. The system in accordance with claim 8, wherein the single wire segment includes a first inspection zone and a second inspection zone defined at different lengths along the single wire segment, said visual imaging device configured to capture at least one image as the first inspection zone is substantially aligned with said array of mirrors, and configured to capture at least one image as the second inspection zone is substantially aligned with said array of mirrors.

10. The system in accordance with claim 9, wherein each mirror in said array has a length such that the reflection from a single mirror includes the image of the first and second inspection zones when viewed from the single vantage point.

11. The system in accordance with claim 8, wherein each mirror in said array has a length such that the reflection from a single mirror includes the image of the first and second inspection zones when viewed from the single vantage point.

12. A method of inspecting a first inspection zone and a second inspection zone defined at different lengths along a single wire segment, said method comprising:
   positioning the single wire segment within a side wall of a guide tube, the side wall fabricated from an at least partially transparent material;
   orienting mirrors in an array of mirrors positioned about the side wall of the guide tube such that:
      a reflection of the single wire segment through the side wall from each mirror in the array of mirrors forms a circumferential view of the first inspection zone and the second inspection zone of the single wire segment;
      the reflection from each mirror is within a field of view from a single vantage point; and
      a length of a first optical path from the first inspection zone to the single vantage point is substantially similar to a length of a second optical path from the second inspection zone to the single vantage point;
   determining, at the single vantage point, defects in the single wire segment from the reflection of the first inspection zone and the second inspection zone of the single wire segment, wherein the single vantage point is coaxially aligned with a centerline of the guide tube;
   capturing at least one image of the reflection of the first inspection zone and the second inspection zone of the single wire segment, wherein the at least one image is captured from the single vantage point; and
   positioning the array of mirrors adjacent to an insertion portion of the guide tube, wherein a plurality of images of the first inspection zone and the second inspection zone of the single wire segment within the side wall in the reflection are captured at different time intervals as the single wire segment is inserted through the guide tube.

13. The method in accordance with claim 12, wherein orienting mirrors in an array comprises:
   orienting a first plurality of mirrors such that the image of the first inspection zone within the side wall is in a first reflection from the first plurality of mirrors when viewed from the single vantage point; and
   orienting a second plurality of mirrors such that the image of the second inspection zone within the side wall is in a second reflection from the second plurality of mirrors when viewed from the single vantage point, wherein mirrors in the first plurality are offset from mirrors in the second plurality relative to the single vantage point.

14. The method in accordance with claim 13 further comprising:
   positioning the first plurality of mirrors at a shorter distance from the single vantage point than the second plurality of mirrors, the first plurality of mirrors including a plurality of groups of mirrors spaced at regular intervals about the guide tube; and
   orienting mirrors in each group such that a length of a first optical path from the first inspection zone to the single vantage point is substantially similar to a length of a second optical path from the second inspection zone to the single vantage point.

15. An apparatus for use in inspecting a first inspection zone and a second inspection zone defined at different lengths along a single wire segment, said apparatus comprising:
- a guide tube comprising a side wall fabricated from an at least partially transparent material, said guide tube sized to receive the single wire segment; and
- an array of mirrors positioned about said side wall of said guide tube, wherein each mirror in said array is oriented such that:
- a reflection of the single wire segment in said array of mirrors forms a circumferential view of the first inspection zone and the second inspection zone of the single wire segment positioned within said side wall;
- the reflection from each mirror is within a field of view from a single vantage point; and
- a length of a first optical path from the first inspection zone to the single vantage point is substantially similar to a length of a second optical path from the second inspection zone to the single vantage point,
- wherein the single vantage point is coaxially aligned with a centerline of said guide tube;
- wherein said array of mirrors comprises:
- a first plurality of mirrors oriented such that the image of the first inspection zone is in a first reflection from said first plurality of mirrors when viewed from the single vantage point; and
- a second plurality of mirrors oriented such that the image of the second inspection zone is in a second reflection from said second plurality of mirrors when viewed from the single vantage point, wherein mirrors in said first plurality are offset from mirrors in said second plurality relative to the single vantage point;
- wherein said first plurality of mirrors is positioned at a shorter distance from the single vantage point than said second plurality of mirrors, said first plurality of mirrors comprising a plurality of groups of mirrors spaced at regular intervals about said guide tube,
- wherein mirrors in each group are oriented such that a length of a first optical path from the first inspection zone to the single vantage point is substantially similar to a length of a second optical path from the second inspection zone to the single vantage point.

16. The apparatus in accordance with claim 15, wherein said array of mirrors comprises at least three mirrors spaced at regular intervals about said side wall of said guide tube.

17. The apparatus in accordance with claim 15, wherein each mirror in said array has a length such that the reflection from a single mirror includes the image of the first and second inspection zones when viewed from the single vantage point.

18. The apparatus in accordance with claim 15, wherein each mirror in said array has a length such that the reflection from a single mirror includes the image of the first and second inspection zones when viewed from the single vantage point.

19. The apparatus in accordance with claim 15, wherein each mirror in said first plurality of mirrors includes a reflective face having a truncated rhomboid-shaped profile such that the second reflection from said second plurality of mirrors is visible between adjacent mirrors in said first plurality when viewed from the single vantage point.

20. The apparatus in accordance with claim 15, wherein said first and second pluralities of mirrors each comprise four mirrors spaced at regular intervals about said guide tube.

* * * * *